2 Sheets—Sheet 1.
T. CHOPE.
Thill-Coupling.
No. 13,778. Patented Nov. 13. 1855.
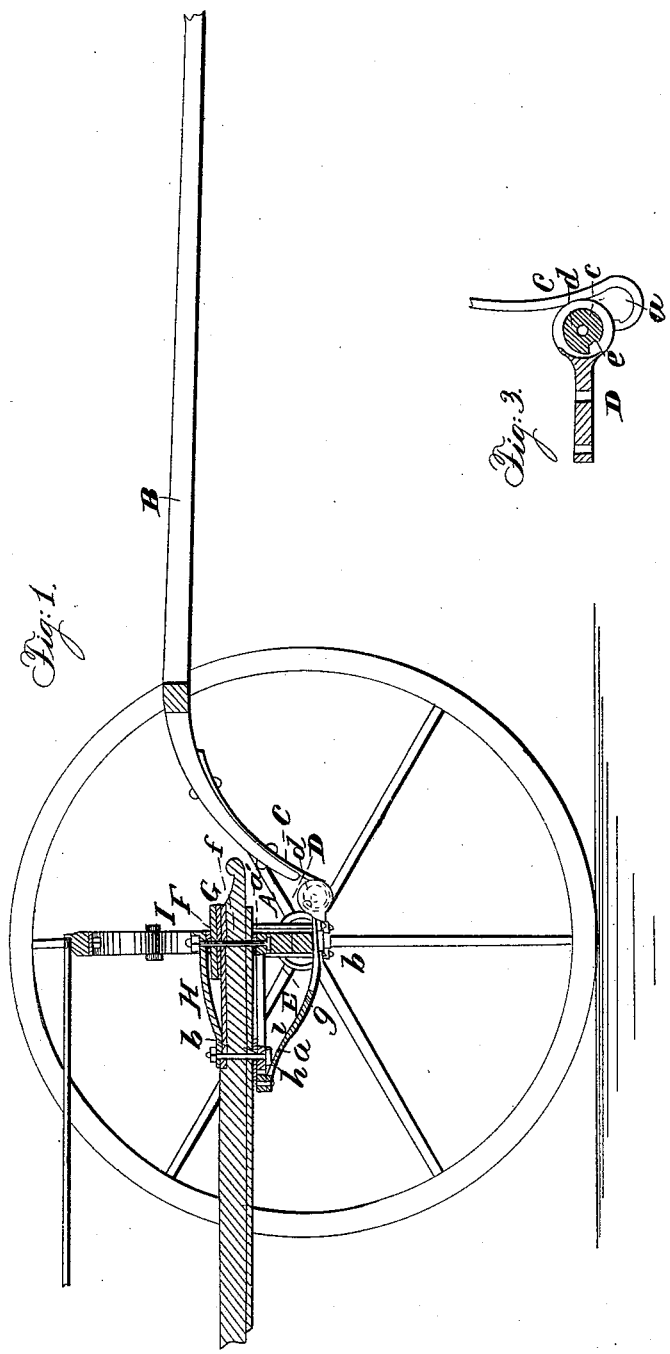

2 Sheets—Sheet 2.
T. CHOPE.
Thill-Coupling.
No. 13,778.
Patented Nov. 13, 1855.
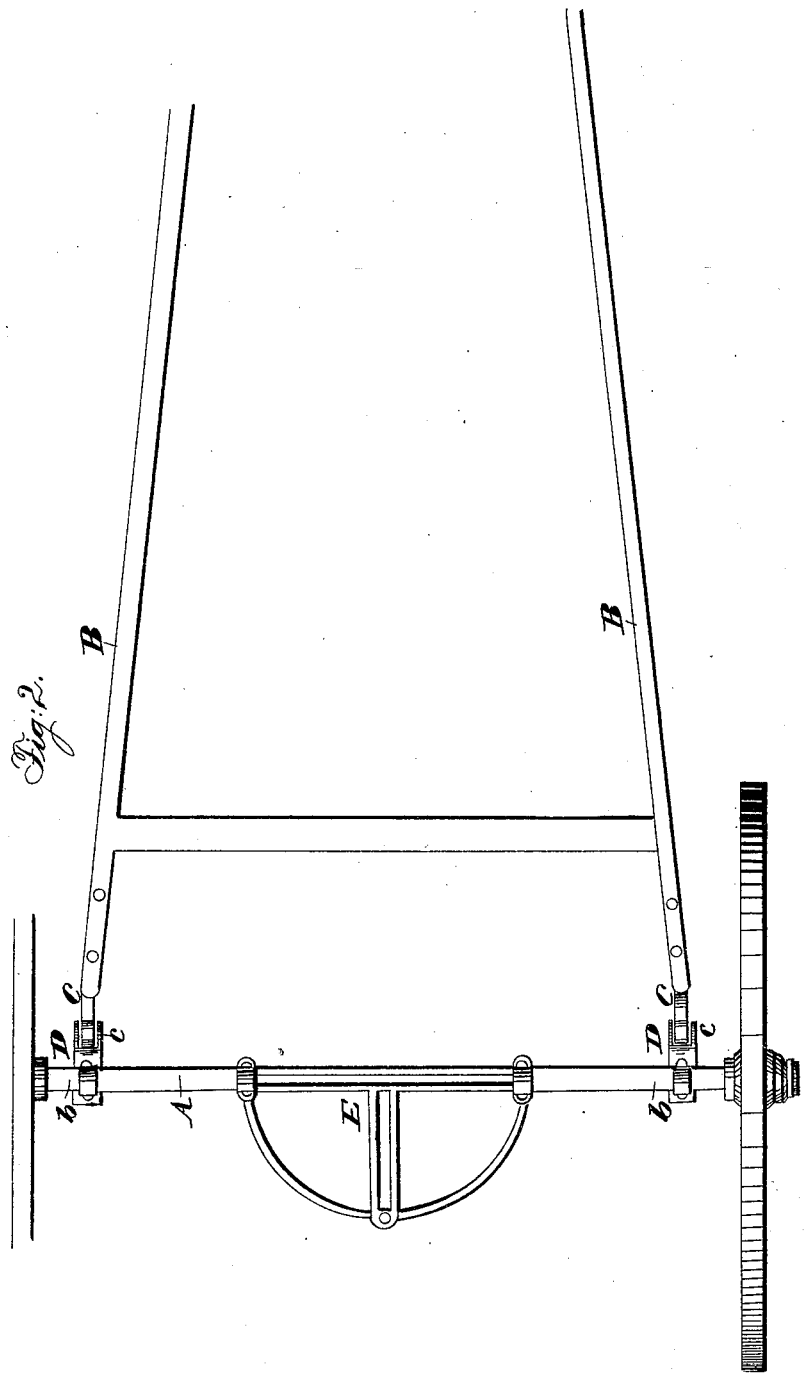

UNITED STATES PATENT OFFICE.

THOS. CHOPE, OF DETROIT, MICHIGAN.

ATTACHING SHAFTS TO AXLES.

Specification of Letters Patent No. 13,778, dated November 13, 1855.

*To all whom it may concern:*

Be it known that I, THOMAS CHOPE, of Detroit, in the county of Wayne and State of Michigan, have invented a new and useful Improvement in Vehicles; and I do hereby declare that the following is a full, clear, and exact description of the same, reference being had to the annexed drawings, making a part of this specification, in which—

Figure 1, is a longitudinal vertical section of the front part of the running gear of a vehicle, with my improvements applied to it. Fig. 2, is a detached plan or top view of the front axle, shafts, and the slotted T shaped bar attached to the axle. Fig. 3, is a section of one of the couplings or connections by which the shafts are attached to the front axle.

Similar letters of reference indicate corresponding parts in the several figures.

The nature of my invention consists in the peculiar mode of attaching the shafts of vehicles to the front axles.

To enable others skilled in the art to fully understand and construct my invention, I will proceed to describe it.

A, represents the front axle of a vehicle, and B, B, represent the shafts. The axle and shafts are of the usual construction. In the back ends of the shafts B, B, metallic plates C, C, are attached, one to each shaft. The ends of these plates are bent or curved in semicircular form and have each a small lip (a), on their ends, as clearly shown in Fig. 3. To the axle A, there are attached by "clips" (b), (b), metal projections D, D, the outer ends of which are forked and have small metal cylinders (c), fitted in them. The cylinders having axes (d), passing through them, the axes having their bearings in the sides of the projections. The cylinders (c), have notches (e), cut in their peripheries, one in each said notches receiving the lips (a), on the ends of the curved plates C. The shafts B, B, are secured to the front axle A, by passing the curved ends of the plates behind the cylinders (c), the lips (a), fitting in the notches (e), in the cylinders. The lips (a), are secured or kept in the notches when the shafts are in the usual or proper position by the ends of the projections D, D, which are of concave form, as shown clearly in Fig. 3. The shafts are detached from the projections when desired by raising them so that the notches (e), in the cylinder will be brought below the concave ends of the projections D, thereby allowing the lips (a), to be withdrawn from the notches (e).

By the above invention the shafts B, B, may be readily adjusted to and detached from the axle A, and the shafts when in proper position will be firmly secured to the axle and cannot be casually detached therefrom.

The invention is simple, may be economically applied, and adds strength and durability to the vehicle.

Having thus described my invention, what I claim as new, and desire to secure by Letters Patent, is—

Attaching the shafts B, B, to the front axle A, by means of the curved plates C, C, attached to the back ends of the shafts and the cylinders (c), secured in the ends of the projections D, which are attached to the front axle, the cylinders (c), having notches (e), made in their peripheries to receive the lips (a), on the ends of the plates C, substantially as shown and described.

THOS. CHOPE.

Witnesses:
  WM. LANGLEY,
  HENRY CHASE.